United States Patent [19]

Palm

[11] Patent Number: 5,091,680
[45] Date of Patent: Feb. 25, 1992

[54] MOTOR BRAKE CIRCUIT FOR MAGNETIC DISK DRIVE SYSTEM

[75] Inventor: William A. Palm, Minnetonka, Minn.

[73] Assignee: Seagate Technology, Inc., Scotts Valley, Calif.

[21] Appl. No.: 679,917

[22] Filed: Apr. 23, 1991

Related U.S. Application Data

[63] Continuation of Ser. No. 475,704, Feb. 6, 1990, abandoned.

[51] Int. Cl.⁵ .............................................. H02P 3/00
[52] U.S. Cl. ..................................... 318/368; 318/275
[58] Field of Search ................ 360/74.1, 75; 318/447, 318/453, 455, 459, 383, 364–372, 375–377, 254, 275, 56, 60, 63, 71

[56] References Cited

U.S. PATENT DOCUMENTS

| | | | |
|---|---|---|---|
| 2,669,679 | 2/1954 | Purifoy | 318/383 |
| 4,090,117 | 5/1978 | Saramoto et al. | 318/365 |
| 4,203,058 | 5/1980 | Chen | 318/380 |
| 4,241,302 | 12/1980 | Benjamin | 318/758 |
| 4,293,782 | 10/1981 | Tanaka et al. | 307/350 |
| 4,317,056 | 2/1982 | Alberts | 307/350 |
| 4,460,857 | 7/1984 | Michaelis | 318/375 |
| 4,479,177 | 10/1984 | Berti | 318/563 |
| 4,481,449 | 11/1984 | Rodal | 318/375 |
| 4,494,056 | 1/1985 | Nishijima et al. | 318/269 |
| 4,494,058 | 1/1985 | Berti | 318/380 |
| 4,580,070 | 4/1986 | Westman | 307/350 |
| 4,594,518 | 6/1986 | Pollachek | 307/350 |
| 4,600,865 | 7/1986 | Caputo | 318/274 |
| 4,613,768 | 9/1986 | Pommer, II | 307/350 |
| 4,658,308 | 4/1987 | Sander, Jr. | 360/74 |
| 4,767,970 | 8/1988 | Rodal | 318/375 |
| 4,831,469 | 5/1989 | Hanson et al. | 360/75 |
| 4,866,554 | 9/1989 | Stupeck et al. | 360/105 |
| 4,916,370 | 4/1990 | Rowan et al. | 318/368 |

FOREIGN PATENT DOCUMENTS

2410926 3/1974 Fed. Rep. of Germany .

OTHER PUBLICATIONS

IBM Technical Disclosure Bulletin, "Motor Control Having BEMF Dynamic Braking", vol. 14, No. 2 (Jul. 1971).

Primary Examiner—William M. Shoop, Jr.
Assistant Examiner—A. Jonathan Wysocki
Attorney, Agent, or Firm—Kinney & Lange

[57] ABSTRACT

A device for braking a rotating magnetic disk in a magnetic storage system senses a back EMF generated by a drive spindle motor. By electrically shorting the coils in the drive spindle motor the rotation of the magnetic disk is stopped. The back EMF is compared with a reference voltage. The reference voltage is selected so that the rate of rotation of the magnetic disk is large enough that a magnetic head "flies" over the surface of the disk, but small enough so that surge currents in the drive spindle motor will not damage the motor coils. Field effect transistors are used to electrically short the coils. A holding capacitor holds a voltage on the gates of the FETs upon loss of power to the magnetic storage system. A reset circuit draws charge from the holding capacitor upon power-up of the storage system.

8 Claims, 3 Drawing Sheets

MOTOR BRAKE CIRCUIT FOR MAGNETIC DISK DRIVE SYSTEM

This is a continuation of application Ser. No. 07/475,704 filed on Feb. 6, 1990, abandoned as of the date of this application.

BACKGROUND OF THE INVENTION

The present invention relates to braking the spindle motor in a magnetic disk drive system upon loss of supplied power without damage to the magnetic read/write head.

Magnetic disk drive systems have become widely accepted in the computer industry as a cost effective form of data storage. In a magnetic disk drive system, a magnetic disk rotates at high speed while a magnetic read/write head "flies" slightly over the surface of the rotating disk. The magnetic disk is carried by a spindle drive motor. The magnetic read/write head is suspended over the disk on a spring loaded support arm. As the disk rotates at high speed, the aerodynamic properties of the magnetic head provide a lifting force which allows the head to glide over the disk surface on a cushion of air. The height of the magnetic read/write head over the disk surface is primarily a function of the rate of disk rotation, the aerodynamic properties of the magnetic head assembly (or "slider") and the force provided by the spring loaded support arm.

Two of the most critical periods in determining magnetic head life span occur during "take off" and "landing." Prior to operation, the head rests on an inner track or "landing zone" of the disk. As the disk begins to rotate from an initial, stopped position, the magnetic head is dragged along the surface of the disk. Once the disk reaches sufficient speed, the aerodynamic lift begins to force the magnetic head assembly away from the disk surface, i.e. the head "takes off." The spindle drive motor provides sufficiently large acceleration so that the magnetic head flies after only a very few rotations of the magnetic disk.

During shutdown of the disk drive system, the magnetic read/write head must "land" upon the surface of the magnetic disk. This landing typically occurs in the landing zone along the inner radius of the magnetic disk surface. After power to the magnetic disk drive spindle motor is shut-off, momentum continues to carry the magnetic disk through its rotation. Various friction sources slowly reduce the speed of rotation of the magnetic disk. As the disk rotation slows, the aerodynamic lifting force is reduced and the magnetic read/write head assembly contacts the disk surface in the landing zone area. Once the magnetic head contacts the disk surface, the head is dragged across the surface as momentum continues the magnetic disk rotation.

Magnetic read/write heads used in modern day disk drive systems are typically extremely small and delicate thin film magnetic heads. The dragging associated with take offs and particularly with landings as described above, is a primary source of magnetic head wear. The landing process described above typically produces a longer dragging period for the magnetic head. The prior art has attempted to limit the length of the dragging period by braking the rotation of the spindle motor. One such design is shown in U.S. Pat. No. 4,658,308 issued Apr. 14, 1987 to Sander, Jr. entitled "Method and Apparatus for Retracting Head and Braking Motor of a Disk Drive Device." The Sander, Jr. patent shows circuitry for electrically shorting out the windings in a magnetic disk drive spindle motor following a predetermined time delay after power loss and retraction of the magnetic head onto the landing zone area of the disk surface. Electrically shorting the coils causes the spindle to rapidly stop rotating. Once the motor windings in Sanders are shorted out, the disk drive rapidly stops spinning and the magnetic head looses lift and drops to the disk surface.

Due to size constraints, however, the spindle motor is designed to be as small as possible. This limits the size of the motor windings. Small windings cannot carry large electrical currents without heating and eventually melting. Electrically shorting the windings of the disk spindle motor results in high surge currents due to back EMF induced in the motor coils by the momentum of the rotating disk. (Back EMF is an effect in which an electric motor acts as an electric generator. In the case of a disk drive, the spinning disk causes electric current to flow in the motor windings.) These high surge currents can permanently damage the spindle drive motor by causing one or more of the windings to melt and form an electrical open circuit.

Other prior art approaches to disk drive braking have used mechanical devices such as normally closed electric relays held in the open position by the power supply in the magnetic storage system. Upon loss of power, these relays return to their closed positions and electrically short out the spindle motor windings. This can also cause large surge currents which can damage the motor windings. Mechanical relays have a number of additional design problems including large power draw during operation, large size, high cost and inherent reliability limitations problematic of electromechanical components.

Upon power up of a storage system, it is desirable to rapidly reset the circuitry used to electrically short the windings of the spindle drive motor. Failure to quickly reset the brake circuitry causes either severe loading of the power supply used to drive the spindle motor or an extended delay period during which the braking circuitry slowly releases the spindle motor.

SUMMARY OF THE INVENTION

The present invention electrically shorts the motor windings and provides an inexpensive, small and reliable means of braking the spindle drive motor in a magnetic disk drive system. The invention minimizes surge current through the electrical shorted motor coils due to the back EMF. With the present invention, it is now possible to brake the spindle drive motor so that the motor windings are subjected to reduced surge currents without increasing the time the magnetic read/write head drags along the landing zone area of the magnetic disk.

The present invention puts an electrical short across the spindle motor windings which causes the motor to stop quickly. The invention uses a back EMF voltage level trigger which senses the back EMF generated in the motor coils by the rotating drive spindle during shut down and triggers the coil shorting circuitry when the back EMF has reached a predetermined trigger level. The trigger voltage level is selected so that the surge current though the electrically shorted coils will not harm the coils. The trigger voltage level is set high enough so that the magnetic head does not drag along the surface of the disk. These two criteria set upper and lower limits for the trigger voltage level.

The present invention preferably uses a charge transfer circuit triggered by a trigger circuit to electrically short the spindle motor coil, a holding capacitor and a reset circuit. The transfer circuit is triggered by the back EMF voltage level trigger and transfers charge onto the holding capacitor. The holding capacitor holds a voltage on the gates of FETs used in a motor driver circuit. This electrically shorts the spindle motor windings. Upon power up of the magnetic storage system, the reset circuit rapidly draws charge away from the holding capacitor, and thereby electrically opens the circuit through the spindle motor coils.

The present invention provides a more reliable and predictable method of quickly stopping the spindle motor during a power-loss stop and eliminates the bulky, high-power consumption electromechanical relay used in the prior art.

DETAILED DESCRIPTION OF THE PREFERRED EMBODIMENTS

A. System Overview

Figure 1:
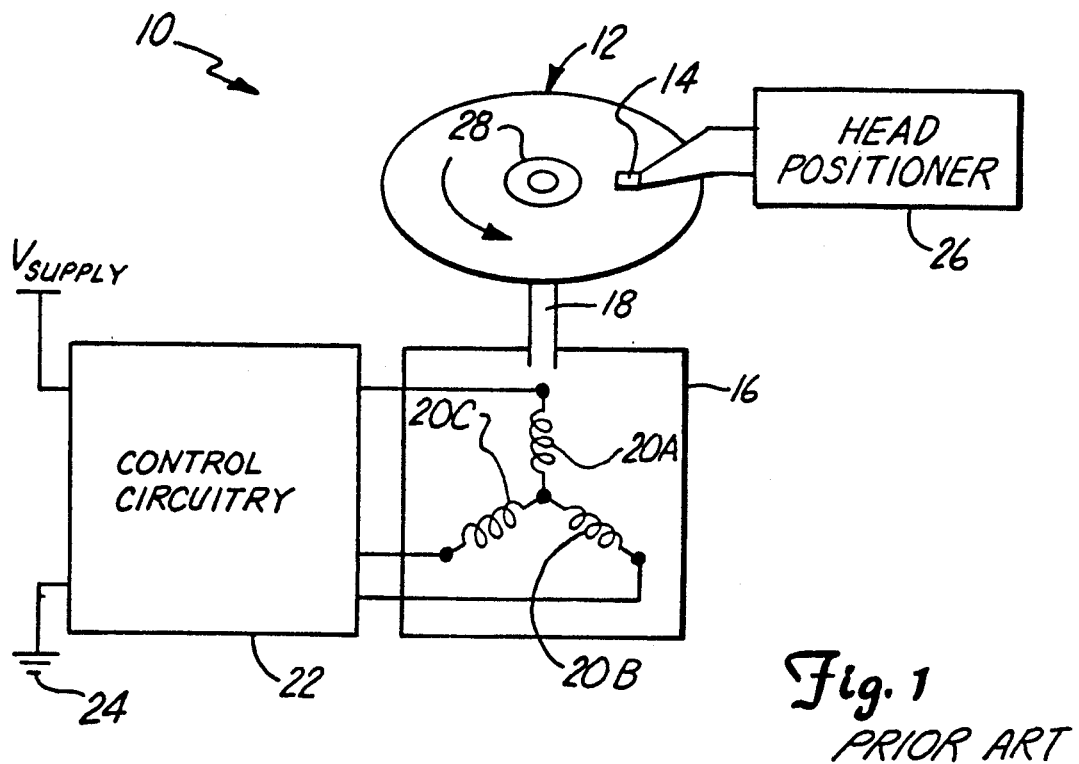
FIG. 1 is a diagram of a magnetic storage system showing a spindle motor and controller.

FIG. 1 is a diagram of a magnetic storage system 10. Magnetic storage system 10 includes a magnetic disk 12 and magnetic read/write head assembly 14. Magnetic disk 12 is connected to a spindle drive motor 16 through a spindle 18. Spindle drive motor 16 includes coils 20A, 20B and 20C. Coils 20A, 20B and 20C are connected to control circuitry 22. Control circuitry 22 is connected to a power supply labeled $V_{supply}$ and electrical ground 24. Magnetic read/write head assembly 14 is connected to a head positioner 26.

In operation, control circuitry 22 selectively applies control voltages to coils 20A, 20B and 20C in spindle drive motor 16. This causes spindle 18 and disk 12 to rotate. At sufficiently high speeds, the rotation of disk 12 causes magnetic head assembly 14 to lift-off the disk surface due to the aerodynamic properties of head assembly 14. After lift-off, magnetic head assembly 14 flies over the surface of disk 12 as disk 12 rotates. Head positioner assembly 26 is used to position magnetic head 14 radially over disk 12. Magnetic head 14 is used to selectively magnetize the surface of magnetic head disk 12 so that digital information is recorded. Magnetic head 14 is also used to read back recorded information from the surface of disk 12. As disk 12 rotates below magnetic head 14, the magnetic flux through magnetic head 14 is changed. This changing flux is sensed and converted into digital information. Magnetic disk 12 includes a landing zone 28, typically around the inner diameter of magnetic disk 12. Magnetic read/write head 14 is stored in landing zone 28 when magnetic disk 12 is not rotating. A specific area of disk 12 is designated as the landing zone because take offs and landings of magnetic disk head 12 would damage any information stored in the landing zone.

During shut down of magnetic storage system 10, or loss of power, the power supply voltage applied to $V_{supply}$ drops to zero. At this time, head positioner 26 moves magnetic head 14 to landing zone 28. Using the present invention, a back EMF voltage generated in coils 20A, 20B and 20C by the continued rotation of disk 12 is sensed by control circuitry 22. When this voltage level reaches a predetermined threshold, coils 20A, 20B and 20C are electrically shorted. This shorts out the back EMF voltage and causes disk 12 to rapidly slows its rotation. When disk 12 slows its rotation, magnetic head 14 drops to the surface of disk 12 at landing zone 28 because the aerodynamic lift drops to zero. The upper limit on the trigger voltage used to trigger the motor braking sequence is determined by the maximum surge current that coils 20A, 20B and 20C can carry without being damaged. This trigger voltage level is dependent on the electrical characteristics of the coil and the energy of the back EMF voltage. The lower limit on the voltage threshold is set according to the minimum rate at which magnetic read/write head assembly 14 will fly over the surface of disk 12. If the trigger voltage level is set too low head 14 will drop the surface of disk 12, while disk 12 continues to rotate which damages the delicate structure of magnetic head assembly 14. In accordance with the present invention, these two design criteria set an optimal voltage range for the back EMF trigger voltage level which depends upon the characteristics of the magnetic storage system.

B. The Embodiment of Figure 2

Figure 2:
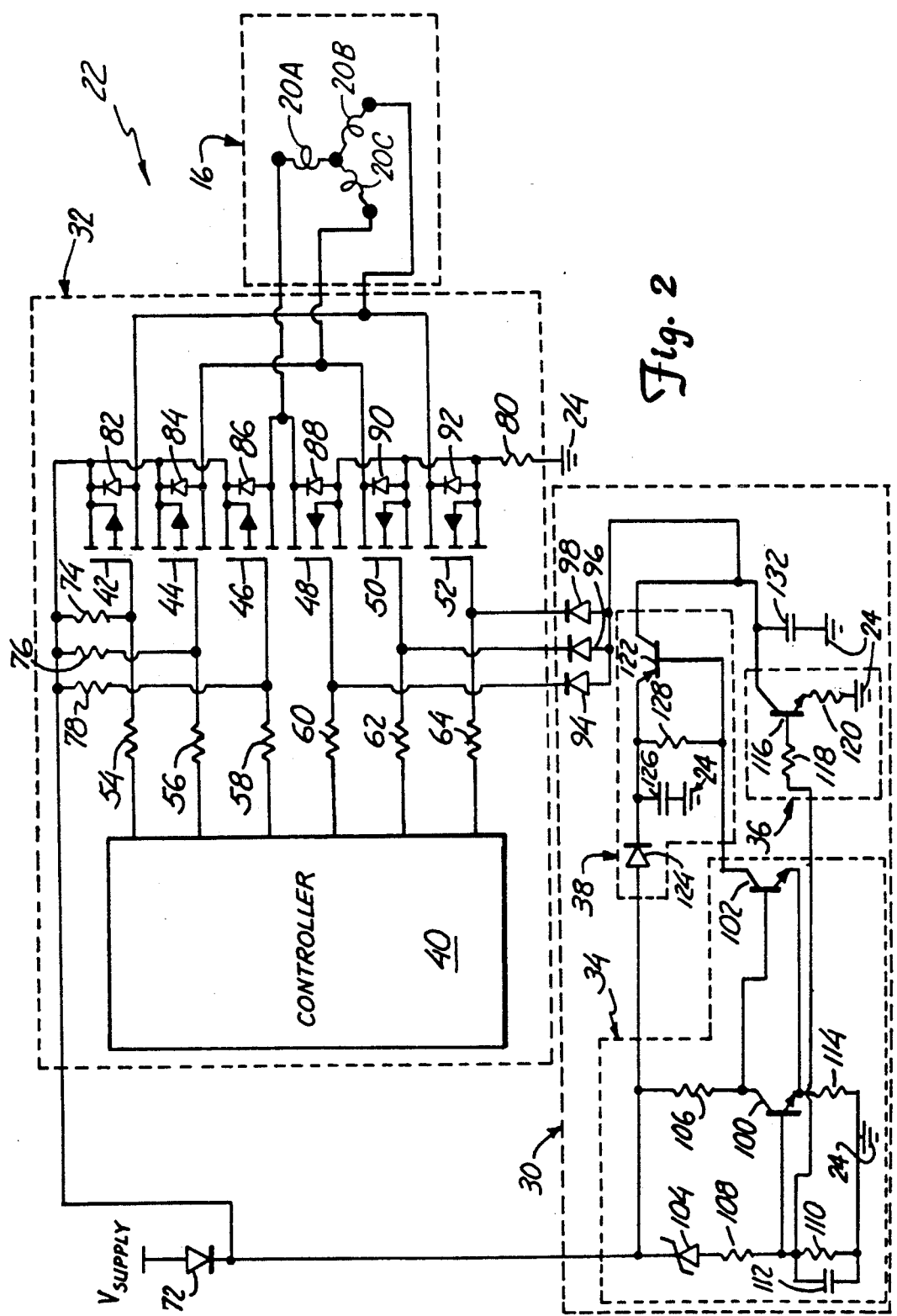
FIG. 2 is a schematic diagram of a motor brake circuit in accordance with the present invention.

FIG. 2 shows one embodiment of control circuitry 22 for braking spindle drive motor 16 in accordance with the present invention. A braking circuit 30 is connected to a control circuit 32. Control circuit 32 is connected to spindle drive motor 16 for rotating spindle 18 and magnetic disk 12. Braking circuit 30 includes a trigger circuit 34, reset circuit 36 and transfer circuit 38.

Control circuit 32 includes controller 40; field effect transistors (FETs) 42, 44, 46, 48, 50 and 52; resistors 54, 56, 58, 60, 62 and 64; resistors 74, 76, 78 and 80; and diodes 82, 84, 86, 88, 90 and 92. The gates of FETs 42, 44 and 46 are connected to controller 40 through resistors 54, 56 and 58 respectively. The gates of FETs 48, 50, and 52 are connected to controller 40 through resistors 60, 62, and 64, respectively. The gates of FETs 42, 44 an 46 are connected to a power supply ($V_{supply}$) through diode 72 and resistors 74, 76 and 78, respectively.

The drains of FETs 42, 44, and 46 are connected to the power supply voltage connection $V_{supply}$ through diode 72. The sources of FETs 42, 44 and 46 are connected to coils 20B, 20C and 20A, respectively, of motor 16. The drains of FETs 48, 50, and 52 are connected to coils 20A, 20C and 20B, respectively, of spindle drive motor 16. The sources of FETs 48, 50 and 52 are connected to electrical ground 24 through a resistor 80. Diodes 82, 84, 86, 88, 90 and 92 are connected between the drain and the source of FETs 42, 44, 46, 48, 50 and 52, respectively.

In operation, controller 40 sends control signals to the gates of FETs 42, 44, 46, 48, 50 and 52 so that power is selectively applied to coils 20A, 20B and 20C of drive spindle motor 16. For example, when the gates of FETs 42 and 50 are at a high voltage level from controller 40, an electrical voltage is applied through coils 20B and 20C, which completes an electrical circuit between the power supply and electrical ground 24. By properly sequencing the voltages applied to the gates of FETs 42, 44, 46, 48, 50 and 52, controller 40 causes spindle 18 and disk 12 to rotate.

The braking circuit 30 is connected to the gates of FETs 48, 50 and 52 through diodes 94, 96 and 98, respectively. Diodes 94, 96 and 98 isolate braking circuit 30 from control circuit 32. Trigger circuit 34 of braking circuit 30 comprises bipolar junction transistors (BJTs) 100 and 102, zener diode 104, resistors 106, 108 and 110, and capacitor 112. The collector of BJT 100 is connected to the cathode of zener diode 104 though resistor 06. The base of BJT 100 is connected to the anode of zener diode 104 though resistor 108 and to electrical ground 24 through resistor 110 and capacitor 112. The emitter of BJT 100 is connected to the emitter of BJT 102 and to electrical ground 24 through resistor 114. The base of BJT 102 is connected to the collector of BJT 100.

Reset circuit 36 includes BJT 116 and resistors 118 and 120. The base of BJT 116 is connected to the base of BJT 100 through resistor 118. The emitter of BJT 116 is connected to electrical ground 24 through a resistor 120.

Transfer circuit 38 includes BJT 122, diode 124, capacitor 126 and resistor 128. The emitter of BJT 122 is connected to the cathode of diode 124. The anode of diode 124 is connected to the cathode of zener diode 104. The emitter of BJT 122 is connected to electrical ground 24 through capacitor 126. The emitter of BJT 122 is connected to the base of BJT 122 though a resistor 128. The base of BJT 122 is connected to the collector of BJT 102 through a resistor 130.

The cathode of zener diode 104 connects to the power supply through diode 72. The collector of BJT 122 and the collector of BJT 116 connect to the gates of FETs 48, 50 and 52 through diodes 94, 96 and 98, respectively. Control circuit 32 also includes a holding capacitor 132. The collector of BJT 116, and the collector of BJT 122 are connected to electrical ground 24 through holding capacitor 132.

In operation, trigger circuit 34 senses the voltage across coils 20A, 20B and 20C through the circuit completed by diodes 82, 84, 86, 88, 90 and 92. A trigger voltage level is set at the base of BJT 100 by zener diode 104 and resistors 108 and 110. BJTs 100 and 102 are connected to form a Schmitt Trigger. Capacitor 112 is used as a filter to smooth the signal from motor windings 20A, 20B and 20C. Capacitor 126 stores charge to be transferred.

BJT 122 in charge transfer circuit 38 is triggered by trigger circuit 34 to transfer charge from capacitor 126 to holding capacitor 132. When holding capacitor 132 is charged, a voltage is applied to the gates of FETs 48, 50 and 52 so that the drain-source connections for FETs 48, 50 and 52 are held open. This provides a connection between coils 20A, 20B and 20C to electrical ground 24 through resistor 80. Holding capacitor 122 holds its charge for an extended period because there is very little current drain through controller 40 and FETs 48, 50 and 52 do not draw substantial current.

The trigger voltage level provided to the base of BJT 100 by zener diode 104 and resistors 108 and 110 should be set within certain limits. The trigger voltage should be large enough to indicate that the magnetic head 14 is not dragging along the surface of disk 12 and low enough that electrically shorting of coils 20A, 20B and 20C does not damage motor 16. This trigger voltage will vary between disk systems and can be found by observing the head while measuring the back EMF voltage.

Upon power-up, BJT 116 receives power from the power supply. Reset circuit 36 draws charge away from holding capacitor 132, which removes the voltage applied to FETs 48, 50 and 52 from braking circuit 30. As a result, coils 20A, 20B and 20C are powered by controller 40 through FETs 42, 44, 46, 48, 50 and 52. Reset circuit 36 quickly releases the short circuit of coils 20A, 20B and 20C, which allows disk 12 to quickly reach operating speed so that magnetic head 14 flies over the surface of disk 12.

C. The Embodiment of FIG. 3

Figure 3:
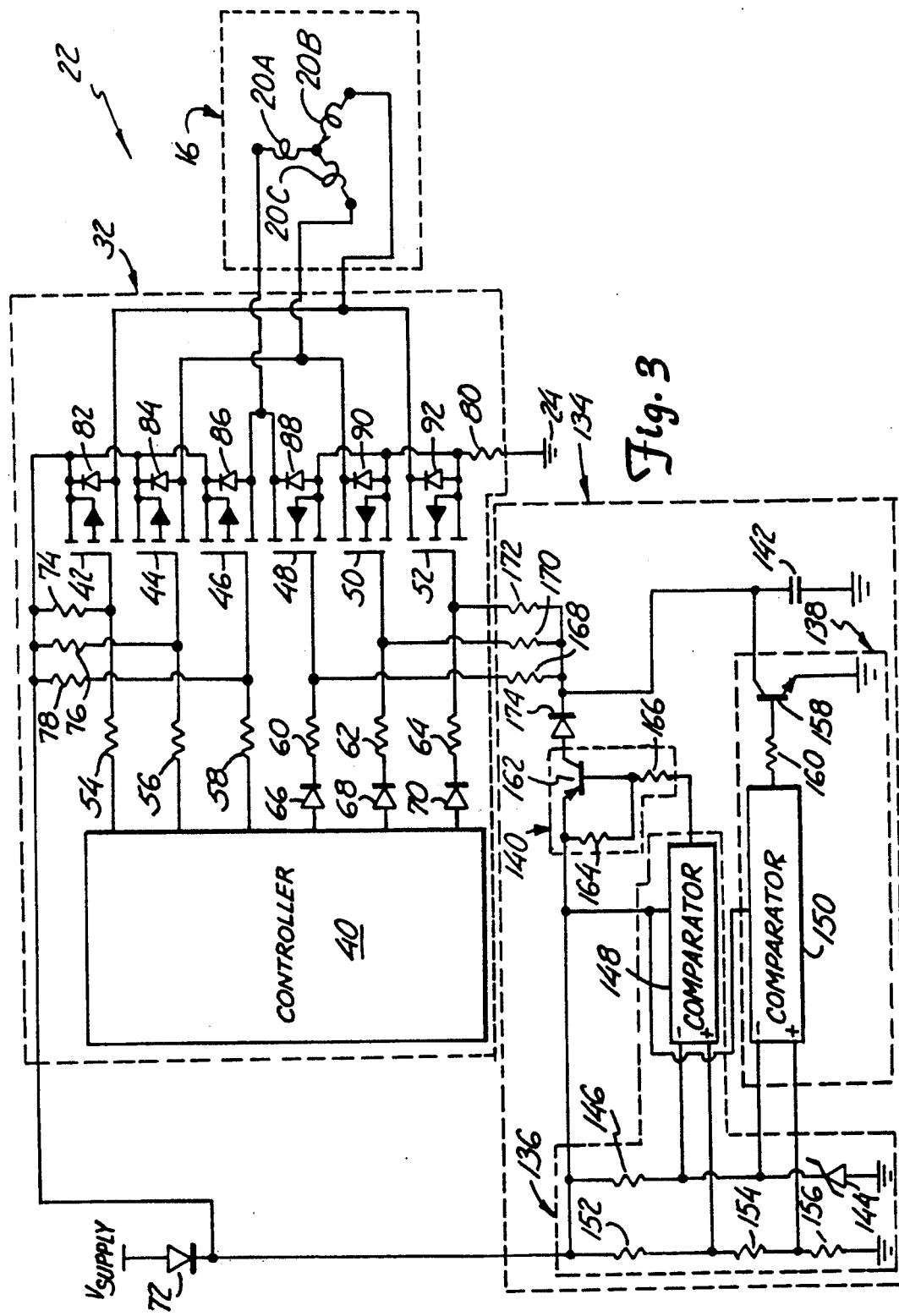
FIG. 3 is a schematic diagram of another embodiment of the motor brake circuit of the present invention.

FIG. 3 shows are alternative embodiment of control circuitry 22 which uses the same control circuit 32 and spindle drive motor 16 shown in FIG. 2. In FIG. 3, circuitry 22 uses an alternative braking circuit 134 in accordance with the present invention. Braking circuit 134 includes trigger circuit 136, reset circuit 138, charging circuit 140 and holding capacitor 142.

Trigger circuit 136 includes zener diode 144, resistor 146, comparator 148 and resistors 152, 154 and 156. Zener diode 144 and resistor 146 develop a trigger voltage level. This voltage level is applied to the negative ($-$) inputs of a comparator 148 and comparator 150 of reset circuitry 138. Comparators 148 and 150 include positive and negative inputs, an output and a 10 power connection. Positive ($+$) inputs of comparators 148 and 150 are connected to coils 20A, 20B and 20C of drive spindle motor 16 through resistors 152, 154 and 156 and diodes 82, 84, 86, 88, 90 and 92 of control circuit 32. Resistors 152, 154 and 156 form a resistor network to develop the trigger voltage level.

Reset circuit 138 includes BJT 158, resistor 160 and comparator 150. The base of BJT 158 is connected to the output of comparator 150 through resistor 160. The collector of BJT 150 is connected to holding capacitor 142.

Charging circuit 140 includes BJT 162 and resistors 164 and 166. The emitter and base of BJT 162 are connected together by resistor 164. The emitter of BJT 162 connects to coils 20A, 20B and 20C of spindle drive motor 16 through diodes 82, 84, 86, 88, 90 and 92. The base of BJT 162 is connected to the output of comparator 148 through resistor 166. The collector of BJT 162 is connected to the gates of FETs 48, 50 and 52 through resistors 168, 170 and 172, respectively, and blocking diode 174.

In operation, the circuit of FIG. 3 works in a manner similar to the circuit of FIG. 2. Comparator 148 of trigger circuit 136 compares the voltage from coils 20A, 20B and 20C with a trigger voltage level and activates charging circuit 140 when the back EMF from spindle drive motor 16 drops below the trigger voltage level. Charging circuit 140 charges holding capacitor 142, which applies a voltage to the gates of FETs 48, 50 and 52. This electrically shorts coils 20A, 20B and 20C to ground 24 through resistor 80. Holding capacitor 142 holds a voltage on the gates of FETs 48, 50 and 52.

Upon reset, the power supply voltage returns to its value of $V_{supply}$, and power is applied to braking circuit 144 and control circuit 32. Comparator 150 compares a reference voltage developed by zener diode 144 and resistor 156 and triggers BJT 158 of reset circuit 138. When comparator 150 applies a current to the base of BJT 158, current is drawn by the collector of BJT 158, and capacitor 142 is rapidly discharged. This removes the holding voltage from the gates of FETs 48, 50 and 52 and allows controller 40 to apply power to coils 20A, 20B and 20C of drive spindle motor 16.

D. Conclusion

The present invention provides a reliable means of braking the drive spindle motor in a magnetic disk drive system. Voltage thresholds are compared to the back EMF voltage developed by the coils in the spindle motor upon loss of power to the disk drive system. The rotation of the drive spindle motor is allowed to coast down to a speed where an electrical short across the drive coils will not cause a current spike to pass through the drive coils which could damage them. The trigger voltage level is selected so that the magnetic head does not drag along the surface of the disk, but rather suddenly drops from its "flying" position to the surface of the disk when the braking circuit is applied. The invention includes a reset circuit for rapidly resetting the drive coils upon power-up. Because the present invention limits the surge current through the drive coils, smaller spindle drive motors are now possible without dragging the magnetic head along the surface of the magnetic disk upon loss of power.

Although the present invention has been described with reference to preferred embodiments, workers skilled in the art will recognize that changes may be made in form and detail without departing from the spirit and scope of the invention.

What is claimed is:

1. An apparatus for braking a storage disk of a storage system which includes spindle drive motor having a coil, wherein the storage system includes a head, and wherein the storage disk rotates at a rate of rotation, the apparatus comprising:
    a spindle drive shaft coupled to the disk and the coil, wherein the coil induces the spindle drive shaft to rotate;
    coil drive means coupled to the coil for selectively providing power to the coil by periodically electrically connecting the coil to a power source which thereby cause the spindle drive shaft to rotate;
    controller means for selectively supplying a control signal to the coil drive means which energizes the coil drive means and selectively couples the coil drive means to the power source;
    means for applying a brake signal to the coil drive means in response to a system power source falling below a predetermined threshold level, wherein the spindle drive shaft is dynamically braked when the brake signal is applied to the coil drive means and the threshold level is predetermined between a first and a second level the first level being representative of a maximum surge current that will not damage the coil and the second level being representative of a minimum rate of rotation of the storage disk at which the head will fly with respect to the storage disk;
    means for holding application of the brake signal to the coil drive means wherein the brake signal is maintained and dynamic braking of the spindle drive shaft is maintained upon loss of system power; and
    means for resetting the holding means upon a return of system power, whereby application of the brake signal to the coil drive means by the means for holding is rapidly removed and the spindle drive shaft is free to rotate.

2. The apparatus of claim 1 wherein the coil drive means is a transistor.

3. The apparatus of claim 1 wherein the means for holding comprises a capacitor.

4. The apparatus of claim 1 wherein the means for applying a brake signal comprises a voltage comparator.

5. The apparatus of claim 1 wherein the means for applying a brake signal comprises a Schmitt Trigger.

6. The apparatus of claim 1 wherein the means for applying a brake signal comprises means for dumping charge into a holding capacitor.

7. The apparatus of claim 1 wherein the means for resetting the holding means comprises means for drawing charge from a holding capacitor.

8. The apparatus of claim 7 wherein the means for drawing charge from a holding capacitor comprises a transistor.

* * * * *

UNITED STATES PATENT AND TRADEMARK OFFICE
CERTIFICATE OF CORRECTION

PATENT NO. : 5,091,680
DATED : February 25, 1992
INVENTOR(S) : William A. Palm

It is certified that error appears in the above-identified patent and that said Letters Patent is hereby corrected as shown below:

Col. 7, Line 41, delete "cause", insert "causes"

Signed and Sealed this

Fourth Day of May, 1993

Attest:

MICHAEL K. KIRK

Attesting Officer

Acting Commissioner of Patents and Trademarks